United States Patent [19]

Kunikane

[11] Patent Number: 4,983,787
[45] Date of Patent: Jan. 8, 1991

[54] COORDINATE INPUT UNIT

[76] Inventor: Takahiro Kunikane, 2335 Komuro Inamachi, Saitama-ken, Japan

[21] Appl. No.: 230,615

[22] Filed: Aug. 10, 1988

[51] Int. Cl.$^5$ ............................................. G08C 21/00
[52] U.S. Cl. ...................................... 178/18; 340/706
[58] Field of Search ............................ 178/18, 19, 20; 340/706

[56] References Cited

U.S. PATENT DOCUMENTS 4,475,008 10/1984 Doi et al. ................................ 178/18

Primary Examiner—Stafford D. Schreyer
Attorney, Agent, or Firm—Thomas R. Morrison

[57] ABSTRACT

The coordinate input unit is provided with a coordinate input pad in which one or more pairs of sheet-like electrodes for a function switch held by a pressure-sensitive electroconductive sheet having weighed input sensitivity different from that of another pressure-sensitive, electroconductive sheet, is laminated on a pair of flexible, sheet-like electrode groups for coordinate input having a plural number of electrodes in accordance with the pressing position, and which is held by the latter pressure-sensitive, electroconductive sheets. The described coordinate input unit allows to perform several input operations of coordinate input and using several function switches using only one hand.

48 Claims, 2 Drawing Sheets

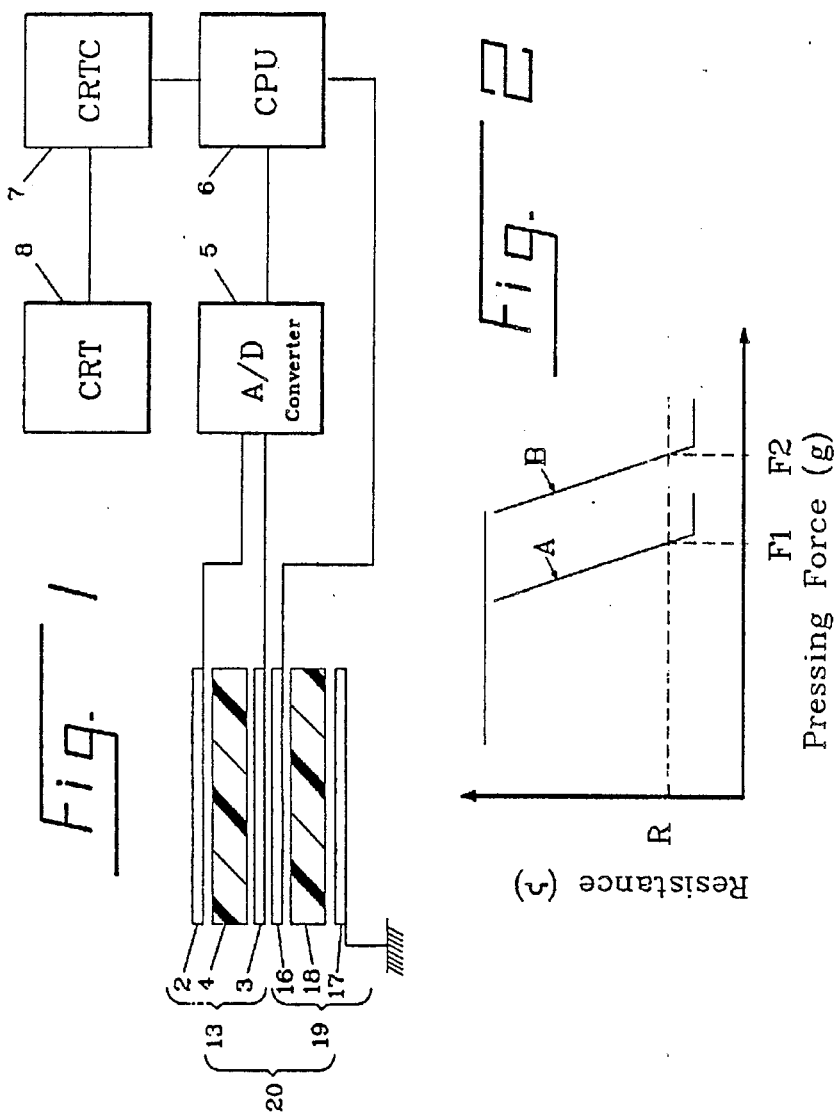

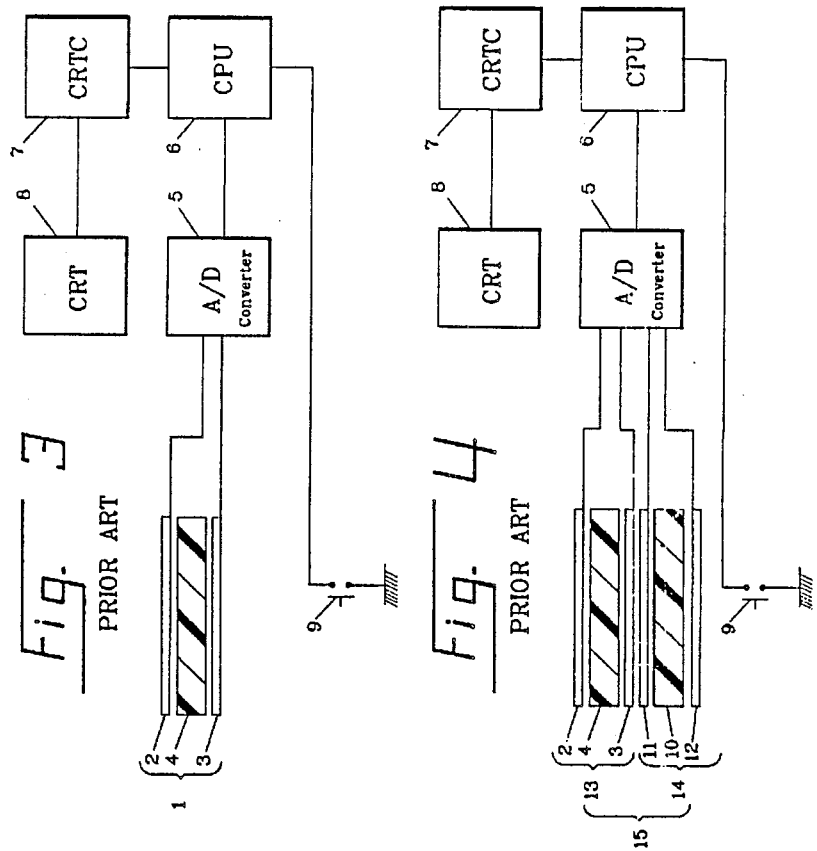

COORDINATE INPUT UNIT

BACKGROUND OF THE INVENTION

1. Field of the Invention

The present invention relates to a coordinate input unit for converting and detecting a pressing position corresponding to coordinate data to be subjected to input into an electric signal.

2. Description of the Prior Art

Various types of electronic control devices, such as computers, convert and detect graphic patterns such as handwritten letters and curves into electric signals to perform data processing, image displaying and erasure based on the input coordinate data. Conventional coordinate input units for feeding the above coordinate data to these data processing devices and image display units are exemplified by those illustrated in FIG. 3. In the drawing, a coordinate input pad (PAD) 1 is composed of a pressure sensitive electroconductive sheet 4 interposed between two flexible sheet-like electrodes 2 and 3 (which are formed by a plural number of electrodes, in the form of a sheet, corresponding to the pressing position) in which position detecting axes cross at right angles to each other. The respective sheet-like electrode groups 2 and 3 are connected to a computation portion 6 formed of a CPU through the intermediary of an A/D (analog/digital) converter 5 and the processed results from the computation portion 6 are fed into a display control portion 7 and are then displayed on a display portion 8 composed of a CRT. Respective function switches 9 used for such as coordinate input switching are connected to the computation portion 6.

When the upper surface of the coordinate input pad 1 is pressed by a writing utensil having a small pressing portion such as a ball pen, the upward and downward resistance on the portion of the pressure sensitive electroconductive sheet 4 corresponding to the pressing position is decreased and the electrode groups 2 and 3 are rendered conductive on the upper and lower surfaces thereof. The coordinate data (analog data) corresponding to the pressing position are converted into digital data in the A/D converter 5 and then fed into the computation portion 6. In this case, the computation portion 6 establishes the coordinate data obtained from the coordinate input pad 1 and the data are displayed on the CRT of the display portion 8 through the intermediary of the display control portion 7 only when the switch 9 is pressed.

The above coordinate input unit involve problems in that the method for applying coordinate data thereto must rely upon a writing utensil having a small pressing portion and in that, when a graphic pattern which is once applied thereto must be partially erased, an eraser and fingers having large pressing portions cannot be used and therefore the same portion must be pressed along the figure to be erased using the writing utensil of the same type with which the data are applied thereto. As shown in FIG. 4, units on which graphic pattern can easily be erased using an eraser and fingers have been developed (refer to Official Gazette of Japanese Patent Laid-Open Publication, No. 117618/1986). In the unit illustrated in FIG. 4, two sheet-like electrode groups 11 and 12 held by the pressure sensitive electroconductive sheet 10 are laminated on two sheet-like electrode groups 2 and 3 held by the pressure sensitive electroconductive sheet 4. In the unit, the first layer corresponds to a coordinate input portion 13 for a small-area pressing portion and the second layer corresponds to a coordinate input portion 14 for a large area pressing portion the whole composing a coordinate input pad 15. The pressure-sensitive electroconductive sheet 4 of one coordinate input portion has a pressing area dependency; whereas the pressure-sensitive electroconductive sheet 10 of the other coordinate input portion 14 has no pressing area dependence.

When the upper portion of the coordinate input pad 15 is pressed by a utensil having a small pressing area such as a ball pen, the analog coordinate data delivered from both coordinate input portions 13 and 14 are converted into digital coordinate data in the A/D converter and are fed to the computation portion 6. The computation portion 6 previously decides which coordinate data applied to the coordinate input portions 13 and 14 and the coordinate data are established when the switch 9 is pressed and are displayed on the CRT of the display portion 8 through the intermediary of the display control portion 7 as is the case with the above.

When the upper surface of the coordinate input pad 15 is pressed by a body having a large pressing area such as a finger or an eraser, the coordinate data delivered from the coordinate input portion 14 corresponding to the body of a large pressing area are fed into the computation portion 6 through the A/D converter 5. When the switch 9 is pressed, the computation portion 6 establishes the coordinate data obtained from the coordinate input pad to display the data on the CRT of the display portion 8 through the display control portion 7. The other coordinate input portion 14 is utilized for erasure in this case, thereby enabling easy erasure by means of an eraser and the like.

Because, in the above-described coordinate input units, various function switches such as a switch 9 for establishing whether the applied coordinate data are valid or not are provided in addition to a writing utensil for pressing, must be used for operating so it is necessary to use both hands. Although a writing utensil for pressing which includes various function switches therein has been proposed for solving the problem, there is another problem in that the writing utensil attached codes thereto is difficult to operate so utensils used for writing alone must be used.

BRIEF SUMMARY OF THE INVENTION

The present invention solves these problems, and is described below.

In the coordinate input unit for converting and detecting a pressing position corresponding to a coordinate to be applied thereto, there is provided a coordinate input pad on which one or more pairs of sheet-like electrodes for function switches held by a pressure sensitive electroconductive sheet having weight sensitivity different from that of another pressure sensitive electroconductive sheet, is laminated on a pair of flexible coordinate input sheet-like electrodes having a plural number of electrodes in accordance with the pressing position and which is held by the later pressure sensitive sheet. In such a way, the respective function switches can be operated by the same hand which holds the pressing writing utensil, and no exclusive writing utensil is therefore required.

BRIEF DESCRIPTION OF DRAWING

FIG. 1 is a structural diagram illustrating one embodiment of the invention.

FIG. 2 is a characteristic diagram showing the relationship between the pressing force and the resistance of the pressure sensitive electroconductive sheet in FIG. 1.

FIG. 3 is a structural diagram showing a conventional coordinate input unit.

FIG. 4 is a structural diagram showing another, conventional coordinate input unit.

DESCRIPTION OF PREFERRED EMBODIMENTS

FIG. 1 is a structural diagram of the coordinate input unit of one embodiment of the present invention. The coordinate input unit is provided with a coordinate input pad 20 formed by laminating one or more (one herein) pairs of sheet-like electrodes 16 and 17 for a functional switch held by a pressure sensitive electroconductive sheet 18 having weighed input sensitivity different from that of a pressure sensitive, electroconductive sheet 4 on a pair of flexible sheet-like electrode groups 2 and 3 for coordinate input having a plural number of electrodes in accordance with the pressing position (a coordinate input position) and which is held by the pressure sensitive, electroconductive sheet 4. In other words, the coordinate input pad 20 has a multi-layered structure, in which one layer is used for a coordinate input portion 13 and the other layers are used for switch portion 19.

In the drawings, numerals 5 to 8 designate components identical to those of conventional units and denote an A/D converter, a calculation portion, a display control portion, and a display portion, respectively.

The respective pressure-sensitive, electroconductive sheets 4 and 18 of the coordinate input portion 13 and the switch portion 19 are, as given in FIG. 2, different in the respective input loads $F_1$ and $F_2$ which approach the conductive resistances R. The respective input loads are settled to $F_1 = 100$ g/0.5 $\phi$ and $F_2 = 150$ g/0.5 $\phi$. The input load required for the coordinate input portion 13 is settled smaller (refer to FIG. 2,A) and the input load required for the switch portion 19 is settled larger (refer to FIG. 2,B). The difference between the input loads, 20 g or above, is sufficient in this case.

Adjustment of the sensitivity of the input loads applied to the pressure-sensitive, electroconductive sheets 4 and 18 may be performed e.g. by changing the thickness thereof. Thickened sheets give greater input loads on the electroconductive resistance R. The input load sensitivity can also be changed by an insulated mesh having an opening which adheres to one side or both sides of the pressure sensitive, electroconductive sheet 4 or 18. In this case, the thickness of the opening or the mesh may change the input load sensitivity.

When the surface of a coordinate input pad 20 is pressed by a load of 120 g/0.5 $\phi$ with, for example, a ball pen, the flexible sheet-like electrode groups 2 and 3 and the sheet-like electrodes 16 and 17 of the coordinate input portion 13 and the switch portion 19, respectively, will be deformed, and the pressing force is applied to the pressure-sensitive electroconductive sheets 4 and 18. The pressing force in this case renders the pressure-sensitive, electroconductive sheet 4 of the coordinate input portion 13 conductive, but does not render the pressure-sensitive, electroconductive sheet 18 of the switch portion 19 conductive. Accordingly, the coordinate data from the coordinate input portion 13 alone is applied to the computation portion 6 through the A/D converter 5. When the pressing force of the ball pen is, for example, 170 g/0.5 $\phi$ in such a state, the pressure-sensitive, electroconductive sheet 18 of the switch portion 19 is also rendered conductive as is the case with the coordinate input portion 13, thereby applying an established switch signal to the computation portion 6 through the switch portion 19. In such a way, the coordinate data from the coordinate input portion 13 is established, whereby the computation portion 6 displays the coordinate position on the CRT of the display portion 8 through the display control portion 7.

Thus the switch portion 19 can be operated to allow operating the coordinate input and switch operation with one hand by varying the pressing load by means of a ball pen and the like. In this case, the writing utensil such as a ball pen is easy to operate because of the absence of codes and no exclusive writing utensil is required.

Although the coordinate input pad 20 in the above embodiment has a two-layered structure, one layer for the coordinate input portion 13 and the other for the switch portion 19, when other function switches are provided, a pair of sheet-like electrodes may be additionally laminated and pressure-sensitive, electroconductive sheets having mutually different input load sensitivities may be intervened between the electrodes. The adjoining sheet-like electrodes (groups) may be separately provided for each layer and may be used in common between the adjoining layers.

What is claimed is:

1. A coordinate input unit for converting and detecting a pressing position in accordance with the coordinate to be applied into an electric signal, said coordinate input unit comprising a coordinate input pad in which one or more pairs of sheet-like electrodes for a function switch held by a pressure-sensitive, electroconductive sheet having weighed input sensitivity different from that of another pressure-sensitive, electroconductive sheet is laminated on a pair of flexible, sheet-like electrode groups for coordinate input having a plural number of electrodes in accordance with the pressing position and which is held by the latter pressure-sensitive, electroconductive sheet.

2. A coordinate input unit in accordance with claim 1, wherein said coordinate input pressure-sensitive, electroconductive sheet has smaller input load, which attains the conductive resistance, than the pressure-sensitive electroconductive sheet for a switch.

3. A coordinate input unit in accordance with claim 1 or claim 2, wherein the difference between the input loads which attain the conductive resistances of the respective pressure-sensitive, electroconductive sheets is about 20 g.

4. A coordinate input unit in accordance with claim 1, wherein the input coordinate is displayed on a CRT.

5. A coordinate input unit in accordance with claim 1, wherein said function switch is a switch for performing the display control of the input coordinate.

6. A coordinate input unit in accordance with claim 1, wherein the two or more, laminated pressure-sensitive, electroconductive sheets are formed in the same composition and have different thicknesses, respectively.

7. A coordinate input unit according to claim 1, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

8. A coordinate input unit in accordance with claim 2, wherein the input coordinate is displayed on a CRT.

9. A coordinate input unit in accordance with claim 3, wherein the input coordinate is displayed on a CRT.

10. A coordinate input unit according to claim 2, wherein said function switch is a switch for performing the display control of the input coordinate.

11. A coordinate input unit according to claim 3, wherein said function switch is a switch for performing the display control of the input coordinate.

12. A coordinate input unit according to claim 4, wherein said function switch is a switch for performing the display control of the input coordinate.

13. A coordinate input unit according to claim 8, wherein said function switch is a switch for performing the display control of the input coordinate.

14. A coordinate input unit according to claim 9, wherein said function switch is a switch for performing the display control of the input coordinate.

15. A coordinate input unit according to claim 2, wherein the two or more laminated pressure-sensitive electroconductive sheets are formed in the same composition and have different thicknesses, respectively.

16. A coordinate input unit according to claim 3, wherein the two or more laminated pressure-sensitive electroconductive sheets are formed in the same composition and have different thicknesses, respectively.

17. A coordinate input unit according to claim 4, wherein the two or more laminated pressure-sensitive electroconductive sheets are formed in the same composition and have different thicknesses, respectively.

18. A coordinate input unit according to claim 8, wherein the two or more laminated pressure-sensitive electroconductive sheets are formed in the same composition and have different thicknesses, respectively.

19. A coordinate input unit according to claim 9, wherein the two or more laminated pressure-sensitive electroconductive sheets are formed in the same composition and have different thicknesses, respectively.

20. A coordinate input unit according to claim 5, wherein the two or more laminated pressure-sensitive electroconductive sheets are formed in the same composition and have different thicknesses, respectively.

21. A coordinate input unit according to claim 10, wherein the two or more laminated pressure-sensitive electroconductive sheets are formed in the same composition and have different thicknesses, respectively.

22. A coordinate input unit according to claim 11, wherein the two or more laminated pressure-sensitive electroconductive sheets are formed in the same composition and have different thicknesses, respectively.

23. A coordinate input unit according to claim 12, wherein the two or more laminated pressure-sensitive electroconductive sheets are formed in the same composition and have different thicknesses, respectively.

24. A coordinate input unit according to claim 13, wherein the two or more laminated pressure-sensitive electroconductive sheets are formed in the same composition and have different thicknesses, respectively.

25. A coordinate input unit according to claim 14, wherein the two or more laminated pressure-sensitive electroconductive sheets are formed in the same composition and have different thicknesses, respectively.

26. A coordinate input unit according to claim 2, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

27. A coordinate input unit according to claim 3, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

28. A coordinate input unit according to claim 4, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

29. A coordinate input unit according to claim 8, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

30. A coordinate input unit according to claim 9, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

31. A coordinate input unit according to claim 5, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

32. A coordinate input unit according to claim 10, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

33. A coordinate input unit according to claim 11, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

34. A coordinate input unit according to claim 12, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

35. A coordinate input unit according to claim 13, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

36. A coordinate input unit according to claim 14, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

37. A coordinate input unit according to claim 6, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

38. A coordinate input unit according to claim 15, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

39. A coordinate input unit according to claim 16, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

40. A coordinate input unit according to claim 17, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

41. A coordinate input unit according to claim 18, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

42. A coordinate input unit according to claim 19, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

43. A coordinate input unit according to claim 20, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

44. A coordinate input unit according to claim 21, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

45. A coordinate input unit according to claim 23, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

46. A coordinate input unit according to claim 23, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

47. A coordinate input unit according to claim 24, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

48. A coordinate input unit according to claim 25, also comprising an insulated mesh of varying thickness, said insulated mesh having an opening, wherein said insulated mesh adheres to one or both sides of said pressure-sensitive sheets, wherein an input load sensitivity may be varied by changing the thickness of said insulated mesh or by varying said opening, or by changing both said thickness and said opening.

* * * * *